Figure 1:
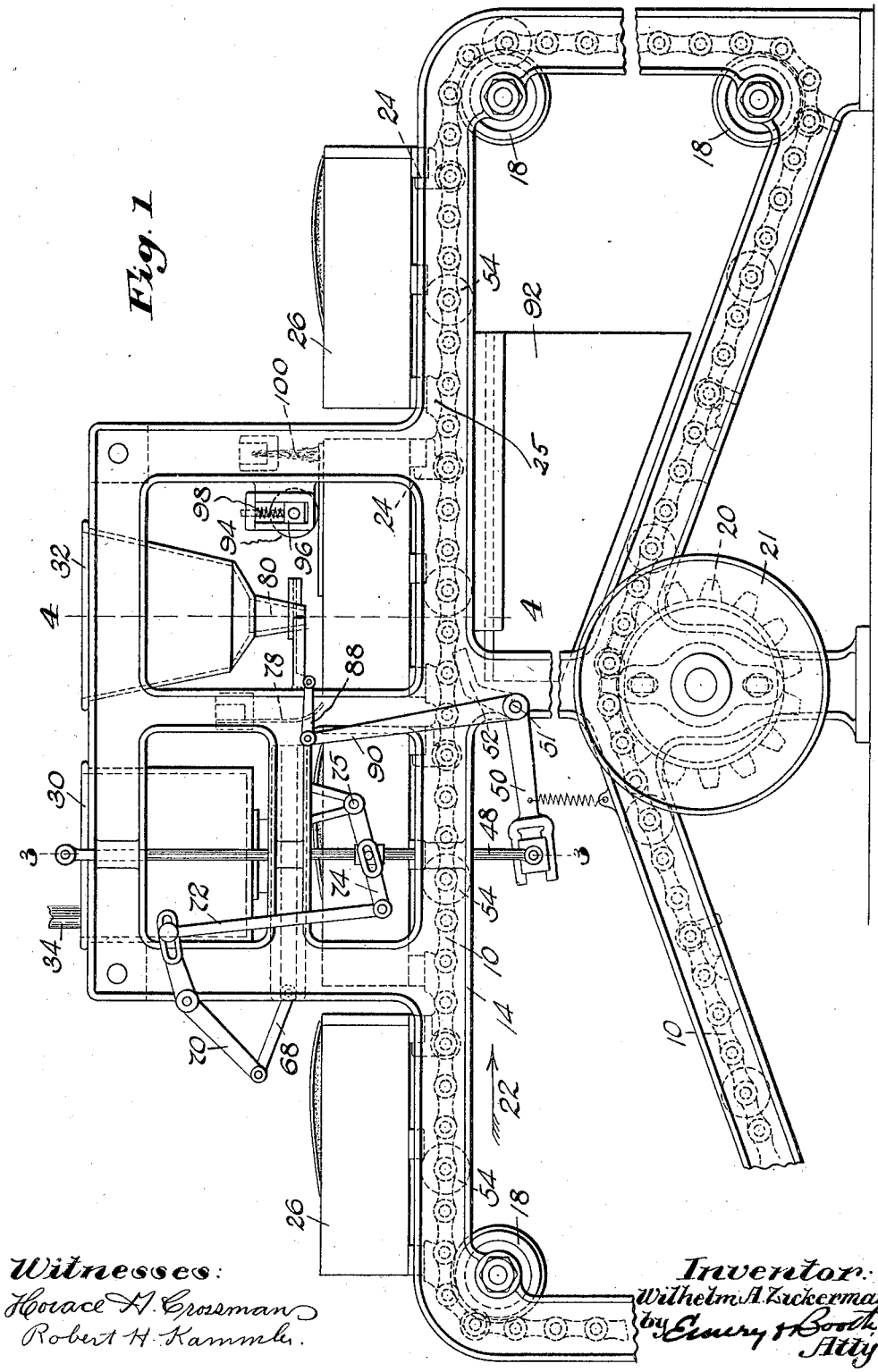

W. A. ZICKERMAN.
INSOLE FILLING MACHINE.
APPLICATION FILED NOV. 19, 1907.

1,067,706.

Patented July 15, 1913.
5 SHEETS—SHEET 2.

Witnesses:
Horace H. Crossman
Robert H. Kammler

Inventor:
Wilhelm A. Zickerman
by Emery & Booth
Attys.

W. A. ZICKERMAN.
INSOLE FILLING MACHINE.
APPLICATION FILED NOV. 19, 1907.

1,067,706.

Patented July 15, 1913.

5 SHEETS—SHEET 3.

Witnesses
Horace H. Crossman
Robert H. Kammler

Inventor
Wilhelm A. Zickerman
by Emery & Booth
Attys

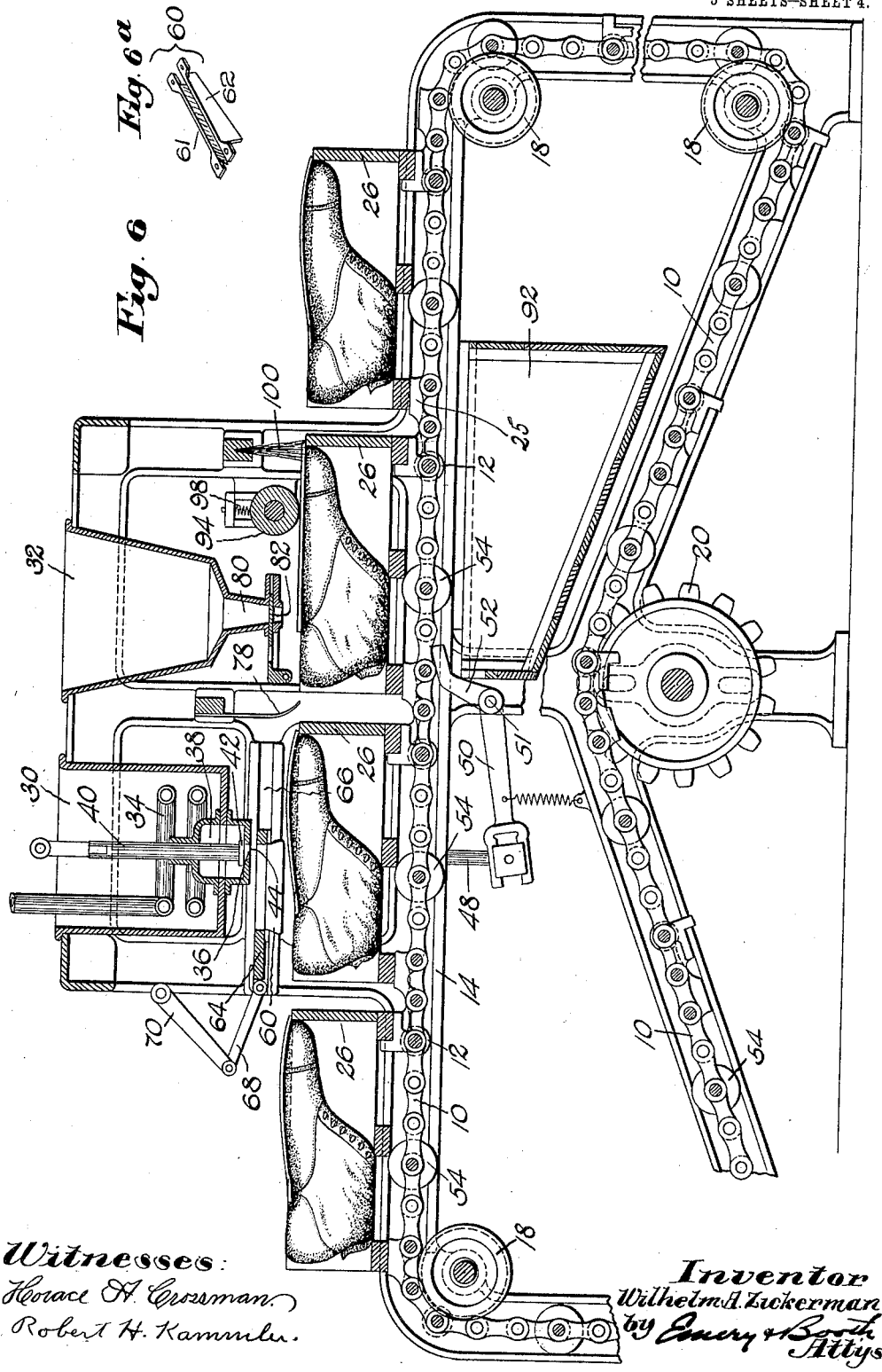

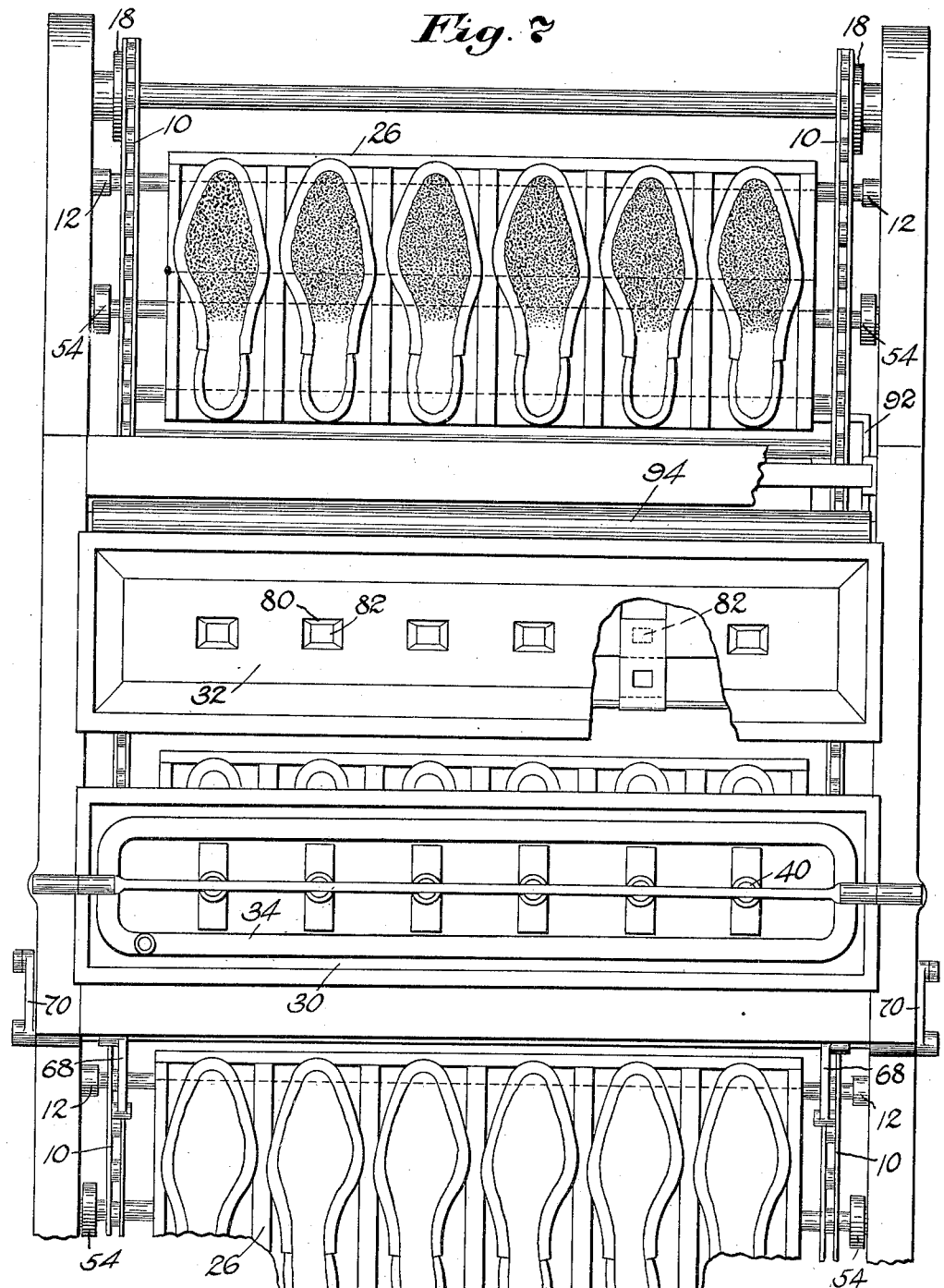

UNITED STATES PATENT OFFICE.

WILHELM A. ZICKERMAN, OF BOSTON, MASSACHUSETTS, ASSIGNOR TO CLIFTON MANUFACTURING COMPANY, OF JERSEY CITY, NEW JERSEY, A CORPORATION OF NEW JERSEY.

INSOLE-FILLING MACHINE.

1,067,706.            Specification of Letters Patent.        Patented July 15, 1913.

Application filed November 19, 1907. Serial No. 402,839.

*To all whom it may concern:*

Be it known that I, WILHELM A. ZICKERMAN, a citizen of the United States, residing at 8 Berwick Park, Boston, county of Suffolk, and State of Massachusetts, have invented an Improvement in Insole-Filling Machines, of which the following description, in connection with the accompanying drawings, is a specification, like letters on the drawings representing like parts.

This invention pertains to machines for applying cement or cementitious materials to the soles of boots and shoes; and more particularly to machines for filling insoles.

The invention consists in various features of construction and operation explained in the course of the following description and defined in the annexed claims.

Figure 2:
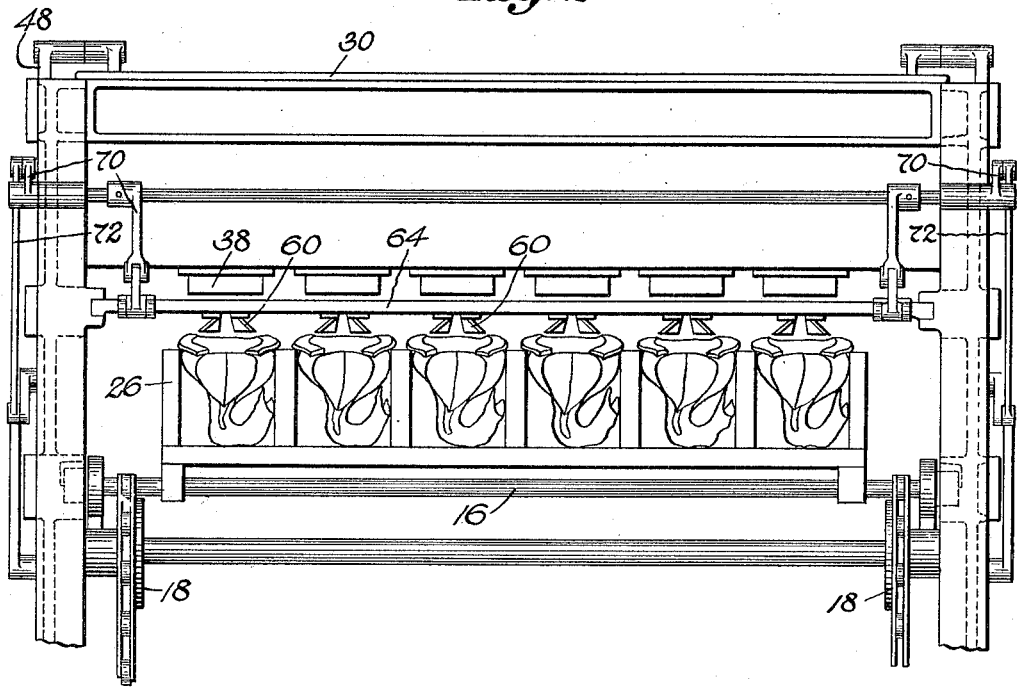
Figure 3:
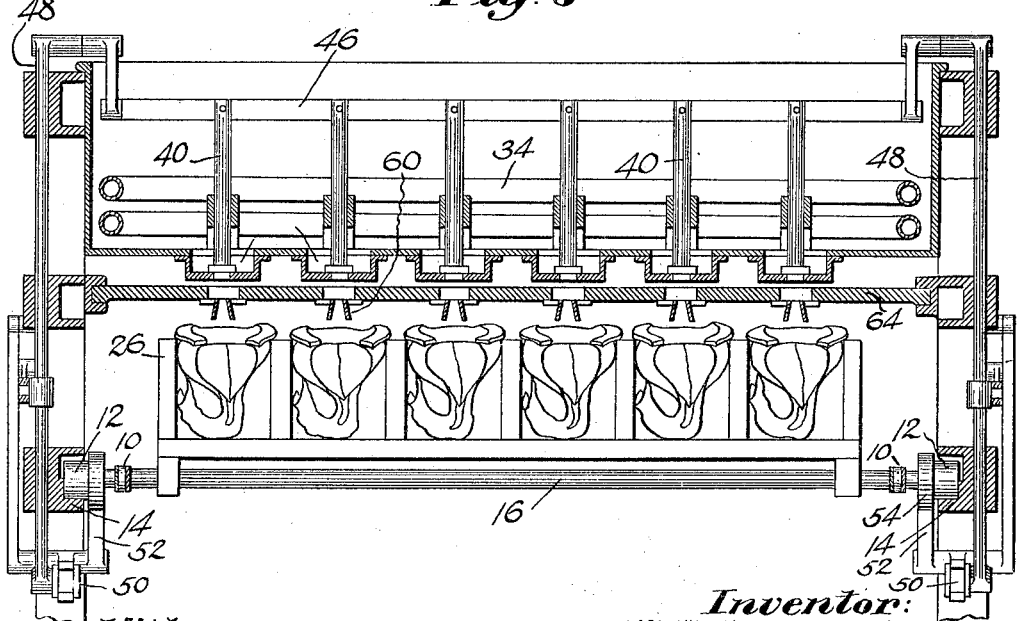
Figure 4:
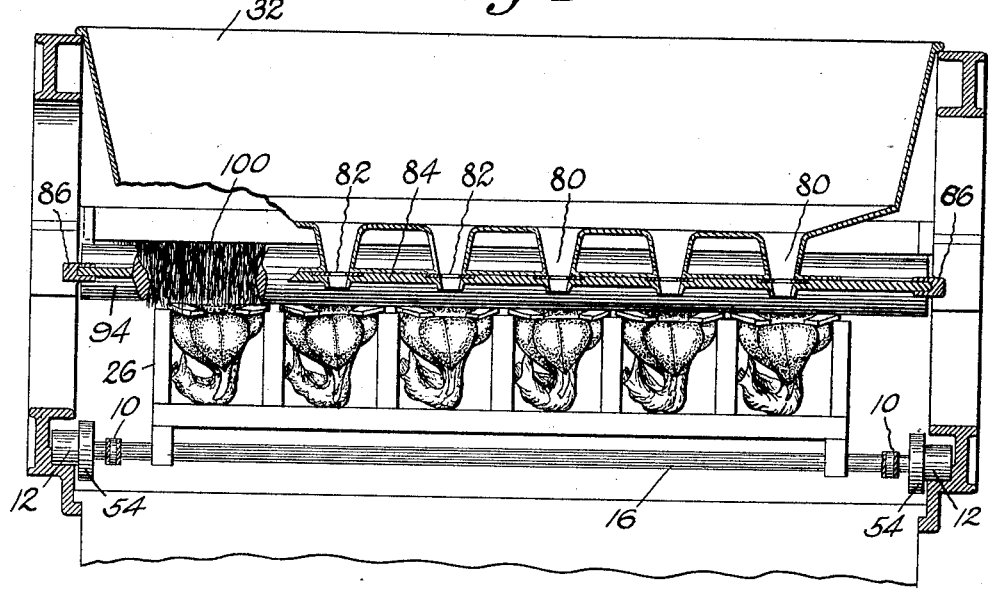
Figure 5:
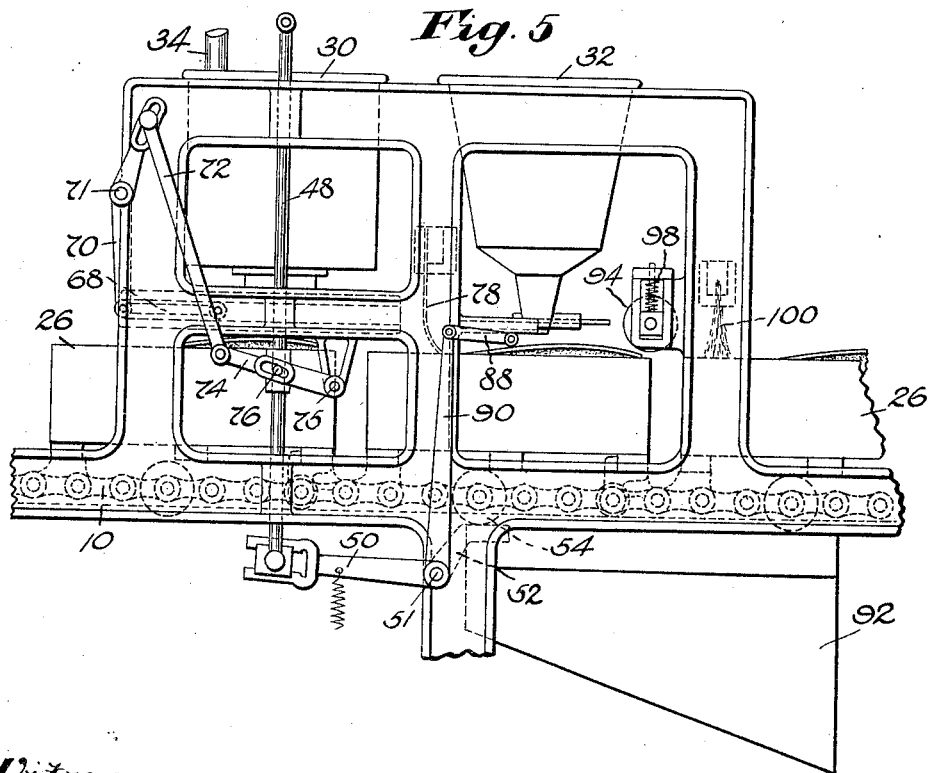

The character of the invention may be best understood by reference to a concrete embodiment shown for purposes of illustration in the drawings, in which:

Figure 1 is a side elevation of the illustrative machine; Fig. 2 is an end elevation viewed from the left in Fig. 1; Fig. 3 is a vertical transverse section on the line 3—3 of Fig. 1; Fig. 4 is a vertical transverse section on the line 4—4 of Fig. 1; Fig. 5 is a side elevation of certain parts shown in Fig. 1 representing said parts in a different position; Fig. 6 is a vertical longitudinal section of the machine; Fig. 6ª is a detail perspective of a specific form of cement distributer; and, Fig. 7 is a plan view of the machine shown in Fig. 1.

The specific embodiment shown in the drawings is a machine for filling insoles and while the invention may be described conveniently in connection with said machine, it is not essentially limited to the specific constructions or functions involved therein.

Referring now to Figs. 1 and 6, the specific machine has work presenting means exemplified by a traveling chain conveyer 10, consisting conveniently of two sprocket chains, disposed at opposite sides of the machine, as shown in Fig. 3, pintles of said chains at intervals along their lengths being provided with projecting rollers 12 to seat in appropriate tracks supplied by horizontal frame members 14. Preferably the roll supporting pintles are integral with cross ties 16, which serve to connect the two sprocket chains and integrate the conveyer 10. The upper run of the conveyer 10, as shown in Fig. 1, may be horizontal or it may be disposed in any practicable relation to the remainder of the machine hereinafter described. From the upper horizontal run the conveyer passes over sprocket wheels 18, 18 and a driving sprocket 20, fixed upon a shaft having a belt pulley 21.

In the preferred operation of the machine the conveyer travels in the direction of an arrow 22 of Fig. 1. For the purposes of the specific machine the conveyer is provided with seats 24, 25, to engage and support shoe carrying trays, it being the operation of the specific illustrative machine to apply cementitious filling material to the insole of a lasted shoe. The seats 24 and 25 are preferably so disposed that a plurality of shoe carrying trays or work supports 26 may be supported in a horizontal series on the upper run of the conveyer; and this series may consist conveniently of four trays, the one at the left in Fig. 1 having been just introduced to the conveyer, and the one at the right being in position to be removed. As shown in Fig. 2 the racks 26 may be of any practicable size to accommodate a number of shoes. It is convenient to have the racks readily removable and replaceable on the conveyer, in order that a supply of loaded racks may be at hand and the operation of the machine need not be delayed to await the loading. In the specific machine the conveyer and its racks may be moved continuously in the direction of the arrow 22 at a rate of speed appropriate to the operations hereinafter described.

It is the design of the illustrative machine to apply cement to the insole, and then to place filling material, such as cork, sawdust or the like upon the cement. Accordingly the machine has a cement tank 30 (Fig. 6) and a hopper 32 for a supply of filling material. A steam coil 34 keeps the cement in the tank 30 in proper fluid condition. In the bottom of the cement tank 30 (Figs. 3 and 6) are a plurality of outlets 36 through which the cement is fed to the work beneath. The outlets 36 are made in the bottoms of chests 38 in which vertically movable plungers 40 are reciprocated to open and close valves 42. When a plunger 40 is elevated a valve 42 is opened and the cement is permitted to flow from the tank through the outlet 36. When the plunger descends it closes the valve 42 and, at the same time, by a projecting lug 44 at its lower extremity, tends to punch out the cement at the bottom of the chest 38, thereby aiding to keep the cement passage clear.

The series of plungers 40 may have common actuating means as by being connected by a horizontal rail 46 suitably connected to vertically movable plunger-actuating rods 48 at opposite sides of the machine. Slidably connected to the lower ends of the rods 48, respectively, are arms 50 of bell cranks pivoted to the frame of the machine at 51. The other arms 52 of the bell cranks are projected, when the plungers 40 are depressed to close the valves 42, into the path of one or more rollers 54 on the conveyer 10. At appropriate times in the travel of said roller the bell crank 50, 52 is rocked clockwise in Fig. 5, thereby elevating the plunger-actuating rods 48, lifting the plungers 40, 40, and opening the valves 42 to permit flow of cement. In the specific machine this flow preferably commences when the advance end of an insole on a rack 26 stands approximately beneath the appropriate outlet 36; and the rolls 54 are properly arranged on the conveyer 10 to suit this purpose. Fig. 5 shows the positions of the various parts shortly after the flow of cement has begun, the advance end of the insole, in this case the toe end, having traveled a short distance past its cement outlet 36.

In order that cement issuing from an outlet 36 in a single stream may be suitably distributed to different parts of the insole, cement distributing means are supplied, as exemplified by a device 60 shown in detached perspective in Fig. 6ª and shown assembled in Figs. 2 and 6. Each distributer 60 may consist of a pair of deflectors 61, 62, interposed in the path of a stream of cement flowing from an outlet 36 so as to split the stream and cause cement to flow down the inclined faces of the deflectors. Preferably, the deflectors 61 and 62 are spaced apart sufficiently to permit a portion of the cement stream to descend between them. The deflectors 61 and 62 may be so shaped in plan view that their lower edges from which the divided stream of cement descends onto the insole shall have an outline approximating that of the face of the insole between its upstanding beads or lips. With such an arrangement the flow of cement issuing from an outlet 36 is divided into three streams, two streams being delivered by the approximately sole-shaped deflectors in the vicinity of the edges of the insole face and the third stream descending between the deflectors being applied to the middle of the insole. This provides for a suitable distribution of cement crosswise the insole.

In order that the cement may be distributed lengthwise the sole, the latter may be moved along beneath an outlet 36 while the cement is flowing. It is preferred that the distributer 60 accompany the sole in this movement while the flow of cement continues, and, accordingly, the series of distributers 60 may be mounted on a carriage 64 movable horizontally in the direction of travel of the conveyer 10, in tracks 66 supplied by the machine frame. Referring to Fig. 5, the carriage 64 may be connected by a link 68 with a lever 70, fulcrumed at 71 to the frame of the machine and adjustably connected to a second link 72, as by having the lever 70 slotted and the link 72 pivoted in said slot by a clamp screw. The lower extremity of the link 72 is pivoted to a lever 74, fulcrumed at 75 on a frame bracket and having a slot to engage a pin 76 fixed upon one of the vertically movable plunger-actuating rods 48. With this arrangement, the vertical movement of a rod 48 (preferably starting when an insole reaches initial position to receive cement) starts the travel of the distributer 60; and thereafter the latter may travel in the same direction and at the same speed as the insole, so that the flowing cement is distributed as well lengthwise the sole as crosswise.

To assist in applying the cement to all parts of the insole, spreading means may be provided as exemplified by a spreader 78 in the form of a flexible sheet secured at its upper edge to a bracket on the frame and having its lower extremities preferably pointed so as to enter between the bead or lip of the insole at its narrowest portion. There is preferably a spreader 78 for each insole and it may extend downwardly far enough to stand in the path of the insole and be flexed as the latter moves beneath it, so as to lie partially upon the insole and spread or smear the cement over its face.

Fig. 1 shows the various parts in the positions which they occupy when the cement valves 42 have just been closed. After an insole has received cement in the manner described, its further travel brings its advance end into position beneath the filling material hopper 32.

Referring now to Fig. 4, which shows a vertical transverse section through the hopper 32, the latter has a plurality of chutes 80, each standing in position to deliver filling material to an insole when the latter is presented beneath it. The chutes 80, 80 are equipped with horizontally sliding gates 82, preferably having common controlling means as by being connected to a gate carriage 84 arranged to slide horizontally in tracks 86 on the frame of the machine. The gate carriage 84 may be connected by a link 88 with a lever 90, rigidly connected at its fulcrum with the bell crank 50, 52, to be rocked by the rocking of said bell crank. This arrangement is such that the operation of the bell crank 50, 52 which starts the flow of cement also rocks the lever 90 clockwise in Fig. 1, and slides the hopper gates 82, 82 toward the right to open the chutes 80 and release a flow of filling material. If there be no work beneath a chute 80 the material escaping therefrom will drop into a box 92, shown in Fig. 6. When, however, an insole stands therebeneath, a quantity of the material will be deposited upon the freshly cemented surface. As the insole travels farther the material, still flowing, will be distributed along its length. A roller 94 is journaled in blocks 96 mounted to slide vertically in brackets on the machine frame and these blocks are normally depressed by preferably strong springs 98. The lowermost position of the roller 94 is such that it will strongly press against an insole as the latter moves beneath it. Thus, as the insole having received a supply of filler passes beneath the roller 94 the latter presses or lays the filler on the insole, packs it thereagainst, and causes it to adhere to the cemented surface. Some of the filling substance in excess of that which is properly laid and packed in desired position may remain after the sole departs from the roll 94, and this superfluous material may be brushed away or discarded in any practicable manner as by means of a brush 100, suitably supported on the frame of the machine. When the sole has passed the brush 100 it will stand in the position indicated at the extreme right of Fig. 1, from which it may be readily removed by simply lifting it from the seats 24 and 25 of the conveyer.

The various operations described as pertaining to the progress of a single sole may take place similarly for each shoe or sole in the rack. And by this multiple operation any practicable number of soles may be operated upon simultaneously.

As illustrated in Figs. 1 and 6 the shoes presenting their insoles to the action of the machine are shown without the lasts in them, the insoles of one shoe in each figure being flattened out by the action of the roll 94. Obviously, it is immaterial, so far as this invention is concerned, whether the shoe be on or off the last when operated upon.

The above described illustrative machine sufficiently explains the character of the invention to enable those skilled in the art readily to ascertain the various modifications of which the invention is susceptible and the numerous forms in which the invention may be embodied to serve different purposes.

In regard to the specific disclosure, it is not indispensable that the exact sequence of operations described be adhered to since so long as the cement and the material to be attached thereby are properly associated in the end, it is immaterial whether they are introduced by separate operations or whether they are mingled preliminarily and later applied. Also, it is not indispensable that all the features of the invention be employed conjointly since they are capable of use separately to advantage.

I believe myself to be the first to produce mechanical means for supplying filler and cement to insoles. Also I believe myself to be the first to produce a machine substantially independent of the skill of the operator for filling insoles. Therefore the subjoined claims are to be construed as defining features of a pioneer invention in such insole filling machines.

Claims.

1. A machine of the character described comprising, in combination, cement-supplying means to deposit cement upon an insole; filler-supplying means to introduce filling material to the insole; filler-laying means to press the filler against the cemented insole; discarding means to remove non-adhering filler; and means relatively to move an insole, and cement- and filler-supplying means, to present the latter respectively in operative relation with the former.

2. A machine of the character described comprising, in combination, cement-supplying means to deposit cement upon an insole; filler-supplying means to introduce filling material to the insole; and controlling mechanism for the cement- and filler-supplying means operable upon presentation of the work in operative relation to said means, for causing the latter to deliver cement and filler.

3. A machine of the character described comprising, in combination, mechanism to introduce cement and filler to an insole; filler-laying and -leveling means to position and shape the filler on the insole; and work-presenting means to present the insole in operative relation to said mechanism.

4. A machine of the character described comprising, in combination, mechanism to introduce cement and filler to an insole; and controlling means for said mechanism operable upon presentation of the insole in operative relation to said mechanism to cause the latter to deliver cement and filler.

5. An insole-filling machine comprising, in combination, insole-filling mechanism to introduce to an insole adhesive and filling material; means to press the filling material and insole together to cause them to adhere; and a work conveying work support constructed to accommodate a shoe to which the insole has been attached.

6. A machine of the character described comprising, in combination, cement-supplying means including a plurality of guides to distribute the cement to different portions of an insole and filler-supplying means to introduce filling material to the cemented insole.

7. A machine of the character described comprising, in combination, cement-supplying means comprising guides shaped to distribute cement to an insole in a substantially sole-shaped stream proximate the insole lip.

8. A machine of the character described comprising, in combination, cement-supplying means to deliver a stream of cement and guiding means to divide said stream and distribute it to different parts of an insole.

9. An insole-filling machine comprising, in combination, progressively acting cement supplying means constructed to deliver cement within the lip of an insole; progressively acting means to supply filling material to the cemented part of the insole; and progressively acting means to press the filling material against the insole.

10. An insole-filling machine comprising, in combination, means to supply cement to an insole face at a plurality of points within its lip; means to spread the cement over the insole within its lip; and means to supply filling material to the cemented area of the insole.

11. An insole-filling machine comprising, in combination, means to supply cement at a plurality of points on an insole face; progressively acting means to supply filling material to the cemented area of the shoe; and means for rolling the filling material on the said cemented area.

12. An insole filling machine comprising, in combination, a work support and means to supply the insole with adhesive and filling material said means including a flexible spreader and an adhesive delivering member having a plurality of relatively angularly positioned adhesive distributing faces to govern the shape of the sole-area on which the material is distributed.

13. An insole filling machine comprising, in combination, means to supply adhesive material to the insole comprising an adhesive delivering member having a plurality of relatively angularly positioned material distributing faces to distribute material simultaneously, longitudinally and laterally on the insole over an area substantially the shape of the insole.

14. An insole filling machine comprising, in combination, traveling means to supply adhesive material to the insole comprising an adhesive delivering member having a plurality of inclined lateral adhesive delivering faces to distribute material over an area of substantially predetermined outline, and means to move the insole before said delivering member for that purpose.

15. An insole-filling machine, comprising, in combination, cement and filler supply means, mechanism to introduce an insole to said cement and filler supply means and means to press the filler into adhesive engagement with the insole.

In testimony whereof, I have signed my name to this specification, in the presence of two subscribing witnesses.

WILHELM A. ZICKERMAN.

Witnesses:
R. S. BARROWS,
I. M. KENT.

---

Copies of this patent may be obtained for five cents each, by addressing the "Commissioner of Patents, Washington, D. C."